Patented Oct. 1, 1929

1,729,615

UNITED STATES PATENT OFFICE

RAYMOND W. HESS AND JOSEPH M. F. LEAPER, OF BUFFALO, NEW YORK, ASSIGNORS TO THE BARRETT COMPANY, OF NEW YORK, N. Y., A CORPORATION OF NEW JERSEY

PROCESS OF MAKING MERCAPTANS

No Drawing.　　　Application filed May 20, 1927.　Serial No. 193,051.

This invention relates to the preparation of a composition of matter which is adapted for use as a flotation agent and for other purposes. It is particularly directed to improvements in the production of aralkyl mercaptans, and more especially of a composition of matter containing benzyl mercaptan.

It has been heretofore proposed to prepare benzyl mercaptan by heating benzyl chloride with sodium thiosulfate in aqueous alcohol solution, separating the sodium benzyl thiosulfate thus produced by evaporating the mixture to dryness, extracting the residue with boiling alcohol, and subsequently heating the resulting isolated sodium benzyl thiosulfate with hydrochloric acid with formation of benzyl mercaptan.

According to the present invention, the production of benzyl mercaptan is accomplished by reacting a benzyl halide with an alkali metal thiosulfate in an aqueous medium and, without isolating from solution the alkali metal benzyl thiosulfate thus produced, acidifying and heating the resulting reaction-mixture whereby benzyl mercaptan, or a composition of matter containing benzyl mercaptan, is formed and precipitated in an impure state as an insoluble body which is subsequently removed from the solution.

The invention will be further illustrated by the following specific example, but it will be understood that the invention is not limited thereto. The parts are by weight.

*Example.*—Into an apparatus equipped with a reflux condenser, an agitator, and with heating and cooling means, there is introduced 127 parts (1 mol) benzyl chloride, 250 parts crystallized sodium thiosulfate (1.01 mols) and 250 parts of water. The agitated mixture is heated and maintained at refluxing temperature until the formation of sodium benzyl thiosulfate is substantially complete. This practically occurs when a homogeneous solution is obtained. To the solution or reaction-mixture thus obtained, there is then added about 145 parts of sulfuric acid of about 50 percent strength (0.74 mol), and the mixture refluxed at the boiling point until the reaction is complete or until no further separation of benzyl mercaptan or other decomposition products takes place. Two liquid layers are formed and the oily layer comprising crude benzyl mercaptan, is separated from the cooled mixture by decantation or in any other suitable manner.

In the above example, the proportions of reagents employed as well as the conditions under which the reaction is carried out may be varied. For example, other alkali metal thiosulfates, such as potassium thiosulfate, or other benzyl halides, such as benzyl bromide may be employed. Also, other acids such as hydrochloric acid, may be used. The amount of acid employed, for example, may vary from an amount in considerable excess to an amount just sufficient to give the mixture an acid reaction. Preferably, the amount of acid employed is such as will give to the mixture an acid strength of about 5 to 25 percent. Further the reaction may be carried out in the presence of water alone or in water containing alcohol or other organic solvents; and the temperature may vary, e. g., from about 50° C. to boiling temperature in the formation of the sodium benzyl thiosulfate, and from about 80° C. to boiling temperature in the decomposition of the sodium benzyl thiosulfate with formation of benzyl mercaptan. A pressure below, at or above atmospheric pressure may be employed.

The crude benzyl mercaptan (i. e., benzyl thioalcohol) thus obtained is a liquid usually having a more or less yellow color. In general, it contains about 60 to 75 percent of benzyl mercaptan, 20 to 35 percent of dibenzyl disulfide, the remainder consisting mainly of other decomposition products of sodium benzyl thiosulfate. It appears to be substantially free from benzyl monosulfide. The benzyl mercaptan may be separated from the crude product, if desired, by means of any suitable or well known method.

The crude or impure product as obtained by the process of the present invention, and without purification, is particularly valuable as a flotation agent in the separation of minerals and the concentration of ores by flotation, and its use for such purpose is described in a patent application filed by us of even date, Ser. No. 193,052.

The process of the present invention is also applicable to the preparation of other mercaptans in a similar manner, for example, mercaptans having the general formula R—SH wherein the mercapto group, —SH, is bound to a saturated aliphatic carbon atom in the radical R which is an aralkyl radical, for example, $CH_3C_6H_4 \cdot CH_2$—, etc. They may be prepared by reacting the corresponding organic halide, R.X, where X denotes a halogen atom bound to an aliphatic carbon atom in the group R which represents an aralkyl hydrocarbon radical, with thiosulfate and subsequently subjecting the resulting reaction-mixture to decomposition in an acid medium.

We claim:

1. In the production of a mercaptan of the formula, R—SH, a process which comprises reacting an organic halide of the formula R—X, wherein X denotes a halogen atom bound to an aliphatic carbon atom in the group R which represents an aralkyl radical, with an alkali metal thiosulfate in the presence of water with formation of an alkali metal salt of an aralkyl thiosulfuric acid, and subjecting the resulting reaction mixture to decomposition in an acid medium.

2. In the production of an aralkyl mercaptan associated with an aralkyl disulfide, the process which comprises reacting an aralkyl chloride having the probable formula R—CH$_2$Cl, wherein R denotes an aryl group, with an alkali metal thiosulfate in an aqueous medium with formation of the alkali metal salt of the aralkyl thiosulfuric acid, and subjecting the resulting reaction mixture to decomposition in the presence of an acid added thereto.

3. In the production of an aralkyl mercaptan, a process which comprises reacting an aralkyl monochloride in which the chlorine is attached to a primary aliphatic carbon atom, with sodium thiosulfate in the presence of water and subsequently subjecting the reaction mixture thus obtained to decomposition in an acid medium.

4. In the production of a composition of matter containing benzyl mercaptan, a process which comprises reacting benzyl chloride with sodium thiosulfate in the presence of water with formation of sodium benzyl thiosulfate, and subjecting the resulting reaction mixture to decomposition in the presence of an acid added thereto.

5. In the production of a composition of matter containing benzyl mercaptan, a process which comprises reacting benzyl chloride with sodium thiosulfate in aqueous solution with formation of sodium benzyl thiosulfate and subjecting the resulting reaction mixture to decomposition in the presence of sulfuric acid added thereto.

6. In the production of a composition of matter containing benzyl mercaptan and dibenzyl disulfide, a process which comprises boiling about one molecular proportion of benzyl chloride with about one molecular proportion of sodium thiosulfate in aqueous solution with formation of sodium benzyl thiosulfate, and without isolation of the sodium benzyl thiosulfate, subjecting the resulting reaction mixture to a decomposition in the presence of an amount of sulfuric acid added thereto sufficient to give the mixture an acid strength of about 5 to 25 percent, and subsequently removing the insoluble oily product which separates from the mixture.

7. In the production of a composition of matter containing benzyl mercaptan by the formation and subsequent decomposition of sodium benzyl thiosulfate, the step which comprises the formation of sodium benzyl thiosulfate by reacting benzyl chloride with sodium thiosulfate in an aqueous medium free from alcohol.

8. As a new composition of matter, the product comprising benzyl mercaptan and dibenzyl disulfide obtainable by the action of benzyl halide on an alkali metal thiosulfate in the presence of water and the subsequent decomposition of the resulting reaction-mixture in the presence of an acid added thereto.

9. As a new composition of matter, a product comprising 60 to 75 percent of benzyl mercaptan and 20 to 35 percent of dibenzyl disulfide.

In testimony whereof we affix our signatures.

RAYMOND W. HESS.
JOSEPH M. F. LEAPER.